United States Patent
Hulvey

(10) Patent No.: US 7,532,116 B2
(45) Date of Patent: *May 12, 2009

(54) WIRELESS HUMAN INTERFACE DEVICE WITH INTEGRATED TEMPERATURE SENSOR

(75) Inventor: Robert W. Hulvey, Redondo Beach, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/046,738

(22) Filed: Mar. 12, 2008

(65) Prior Publication Data

US 2008/0211667 A1    Sep. 4, 2008

Related U.S. Application Data

(63) Continuation of application No. 11/244,631, filed on Oct. 5, 2005, now Pat. No. 7,369,046.

(51) Int. Cl.
*G08B 1/08* (2006.01)

(52) U.S. Cl. .............. 340/539.27; 340/539.26; 340/584; 340/588; 345/163; 345/158

(58) Field of Classification Search ........... 340/539.27, 340/539.26, 584, 588; 463/37; 600/390, 600/528; 705/2; 345/163, 106, 156, 158
See application file for complete search history.

(56) References Cited

U.S. PATENT DOCUMENTS

| | | | |
|---|---|---|---|
| 5,603,570 A | 2/1997 | Shimizu | |
| 5,841,425 A * | 11/1998 | Zenz, Sr. ................ | 345/163 |
| 6,816,149 B1 * | 11/2004 | Alsleben ................ | 345/163 |
| 6,851,849 B2 | 2/2005 | Kimura | |
| 6,933,922 B2 * | 8/2005 | Casebolt et al. ........... | 345/157 |
| 7,002,550 B2 * | 2/2006 | Casebolt et al. ........... | 345/157 |
| 7,020,508 B2 * | 3/2006 | Stivoric et al. ............ | 600/390 |
| 7,075,455 B2 | 7/2006 | Nishimura et al. | |
| 7,116,218 B2 * | 10/2006 | Ogawa et al. ............. | 340/447 |
| 7,236,745 B2 * | 6/2007 | Wells et al. ............ | 455/67.11 |
| 2001/0004241 A1 | 6/2001 | Fukano et al. | |
| 2001/0040590 A1 * | 11/2001 | Abbott et al. ............. | 345/700 |
| 2001/0041845 A1 * | 11/2001 | Kim ......................... | 600/528 |
| 2002/0016719 A1 * | 2/2002 | Nemeth et al. ............ | 705/2 |
| 2002/0180693 A1 * | 12/2002 | Muir ........................ | 345/156 |
| 2003/0115395 A1 | 6/2003 | Karcher et al. | |
| 2003/0156381 A1 * | 8/2003 | Lieu et al. ................. | 361/681 |
| 2003/0195040 A1 * | 10/2003 | Breving .................... | 463/37 |
| 2003/0226837 A1 * | 12/2003 | Blake et al. ............... | 219/260 |
| 2004/0102815 A1 | 5/2004 | Balczewski et al. | |
| 2004/0113956 A1 * | 6/2004 | Bellwood et al. .......... | 345/863 |
| 2004/0151513 A1 | 8/2004 | Nomura | |
| 2005/0144070 A1 | 6/2005 | Chershire | |
| 2005/0146499 A1 * | 7/2005 | Casebolt et al. ........... | 345/157 |
| 2005/0168438 A1 * | 8/2005 | Casebolt et al. ........... | 345/156 |
| 2006/0007151 A1 * | 1/2006 | Ram ......................... | 345/163 |
| 2006/0071788 A1 | 4/2006 | Hulvey | |
| 2006/0135857 A1 | 6/2006 | Ho et al. | |
| 2006/0164383 A1 * | 7/2006 | Machin et al. ............ | 345/156 |

(Continued)

*Primary Examiner*—George A Bugg
*Assistant Examiner*—Hoi C Lau

(57) ABSTRACT

A wireless human interface device (HID) includes an input interface module for accepting inputs from a user; a microprocessor for processing the accepted inputs; a wireless transmitter for transmitting the accepted inputs to a host; and a temperature sensor for determining the temperature of the wireless HID, wherein the microprocessor transmits the sensed temperature via the wireless transmitter to the host for displaying.

20 Claims, 4 Drawing Sheets

U.S. PATENT DOCUMENTS

2006/0274041 A1* 12/2006 Han .............................. 345/163
2007/0132733 A1*  6/2007 Ram ............................. 345/163
2007/0216646 A1*  9/2007 Sun .............................. 345/163
2008/0165130 A1*  7/2008 Chen ............................ 345/163
2008/0293491 A1* 11/2008 Wu et al. ....................... 463/37

* cited by examiner

WIRELESS HUMAN INTERFACE DEVICE WITH INTEGRATED TEMPERATURE SENSOR

CROSS-REFERENCE TO RELATED APPLICATION

This application is a continuation of U.S. patent application Ser. No. 11/244,631, filed Oct. 5, 2005, entitled "WIRELESS HUMAN INTERFACE DEVICE WITH INTEGRATED TEMPERATURE SENSOR," also referred to as U.S. Patent Publication 2006-0071788 A1. U.S. patent application Ser. No. 11/244,631 is incorporated by reference herein in it entirety.

FIELD OF THE INVENTION

The present invention relates generally to Human Input Devices, and more particularly to a wireless Human Input device with integrated temperature sensor.

BACKGROUND OF THE INVENTION

Wireless communication is rapidly growing. For example, peripheral devices and human interface devices (HIDs) are increasingly utilizing wireless communication, such as Bluetooth, to communicate with a host computer.

Bluetooth (BT) is a wireless protocol and thus requires a radio transmitter and radio receiver. Bluetooth integrated circuits (ICs) and other wireless chips with radios integrated on a single silicon die often incorporate temperature sensors used to calibrate radio circuits across temperature variations. Other wireless protocols, such as those typically operating in the 27 MHz frequency band, may operate in one direction only, in which case only a radio transmitter is required.

In some applications in which the radio is used with a high duty cycle IC, the temperature of the die increases from the ambient temperature due to the high duty cycle of the IC. Hence, while the temperature measurement from the temperature sensor may be good for calibrating the radio circuits, it is not an accurate measurement of the ambient temperature. Furthermore, the radio is often embedded in a product (e.g., inside a laptop case or automobile) which can have an internal temperature that is significantly higher than ambient temperature.

However, in a Bluetooth HID, the radio is typically used at a low duty cycle, typically less than 10%. Hence, the die temperature is not significantly raised above the ambient temperature. Furthermore, the HID is typically separated from the host device and usually contains no other circuitry which would raise its internal temperature.

Therefore, in a BT HID, the die temperature is closely tracking the ambient temperature. The present invention takes advantage of the above characteristics of a BT HID to integrate a temperature sensor in the HID that substantially indicates the ambient room temperature.

SUMMARY OF THE INVENTION

In one embodiment, the invention is a wireless HID including: an input interface module for accepting inputs from a user; a microprocessor for processing the accepted inputs; a wireless transmitter for transmitting the accepted inputs to a host; and a temperature sensor for determining the temperature of the wireless HID, wherein the microprocessor may utilize the sensed temperature for calibrating the radio circuits and transmits the sensed temperature via the wireless transmitter to the host for displaying.

In one embodiment, the invention is a wireless integrated circuit (IC) including an input interface circuit for accepting inputs from a user; a temperature sensor for determining the temperature of the wireless IC; a wireless transmitter for transmitting the inputs; and a processor for calibrating the radio circuits responsive to the sensed temperature and communicating the sensed temperature to the wireless transmitter to be transmitted for display.

In one embodiment, the invention is a method for wirelessly transmitting user inputs and temperature of a location to a host. The method includes: accepting inputs from a user via a human interface device (HID); transmitting the accepted inputs to the host via a wireless transmitter; sensing the temperature of the HID; calibrating the radio circuits responsive to the sensed temperature; and transmitting the sensed temperature to the host for display.

In one embodiment, the wireless transmitter is a Bluetooth transmitter, and the radio circuits comprise a Bluetooth transmitter and a Bluetooth receiver.

In one embodiment, the wireless transmitter is a 27 MHz transmitter.

DETAILED DESCRIPTION

In one embodiment, the present invention utilizes the temperature sensor embedded in a Bluetooth chip to measure the ambient room temperature. The sensed temperature is then sent to the host where it can be displayed to the user as an additional feature of the HID product.

Figure 1:
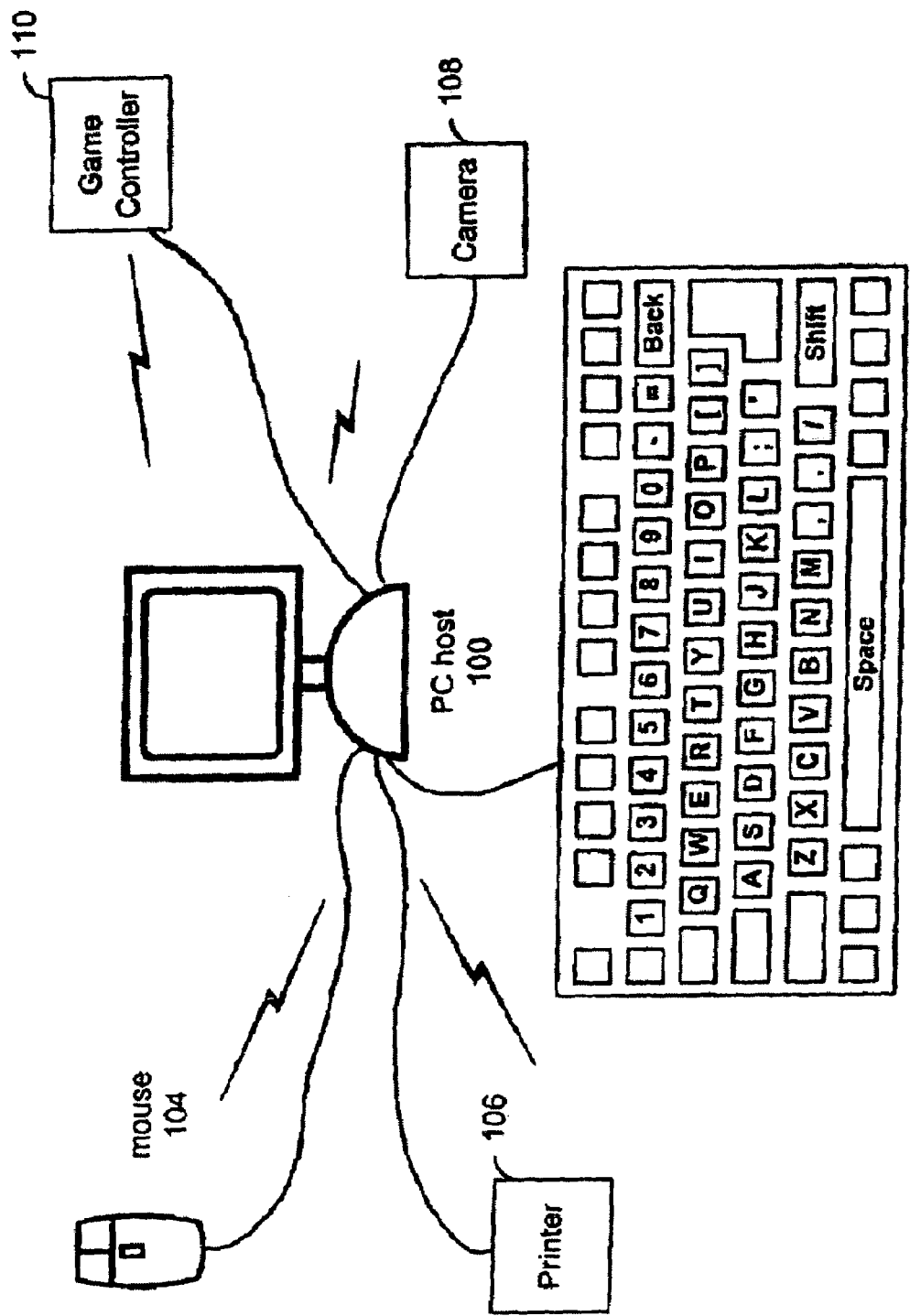
FIG. 1 is an exemplary block diagram of a wireless host system, according to one embodiment of the present invention.

FIG. 1 is an exemplary block diagram of a host system including a PC host 100, a wireless keyboard 102, a wireless mouse 104, a wireless printer 106, a wireless camera 108, and a wireless game controller 110. The host system may also include other wireless HID devices communicating with the PC host 100. The PC host 100 couples to the wireless keyboard 102, the wireless mouse 104, the wireless printer 106, the wireless camera 108, and/or the wireless game controller 110 via a wireless interface. The PC host 100, the wireless keyboard 102, mouse 104, printer 106, camera 108, and game controller 110 support user input operations when the PC host 100 is either in a Basic Input Output System (BIOS) mode of operation or when in an operating system (OS) mode of operation. Each of the above HID devices include an input interface for accepting inputs from a user and a wireless radio transmitter, such as, a Bluetooth transmitter for transmitting the accepted inputs to a host. The wireless radio circuitry includes some type of temperature sensor(s) that is used to calibrate the radio circuitry.

Use of the temperature sensor is most useful in a keyboard in which the Bluetooth module can be placed in an area within the keyboard where it will not be significantly affected by the user's body heat, for example, along the top edge of the keyboard where the user's hands do not typically rest. While the invention may also be employed in other HIDS, such as a mouse, the sensor needs to be placed such that the user's hand does not affect the temperature being sensed.

In one embodiment, in the case of a game controller, the temperature sensor can be used to sense the hand temperature of the user who is holding the game controller, while playing a computer-based game. This bio feedback data may be integrated with some games to gain (or lose) extra bonus points, or become a parameter of the game.

Furthermore, the same wireless device can be used as a standalone temperature sensing device which can be placed remotely from a host computer.

Figure 2:
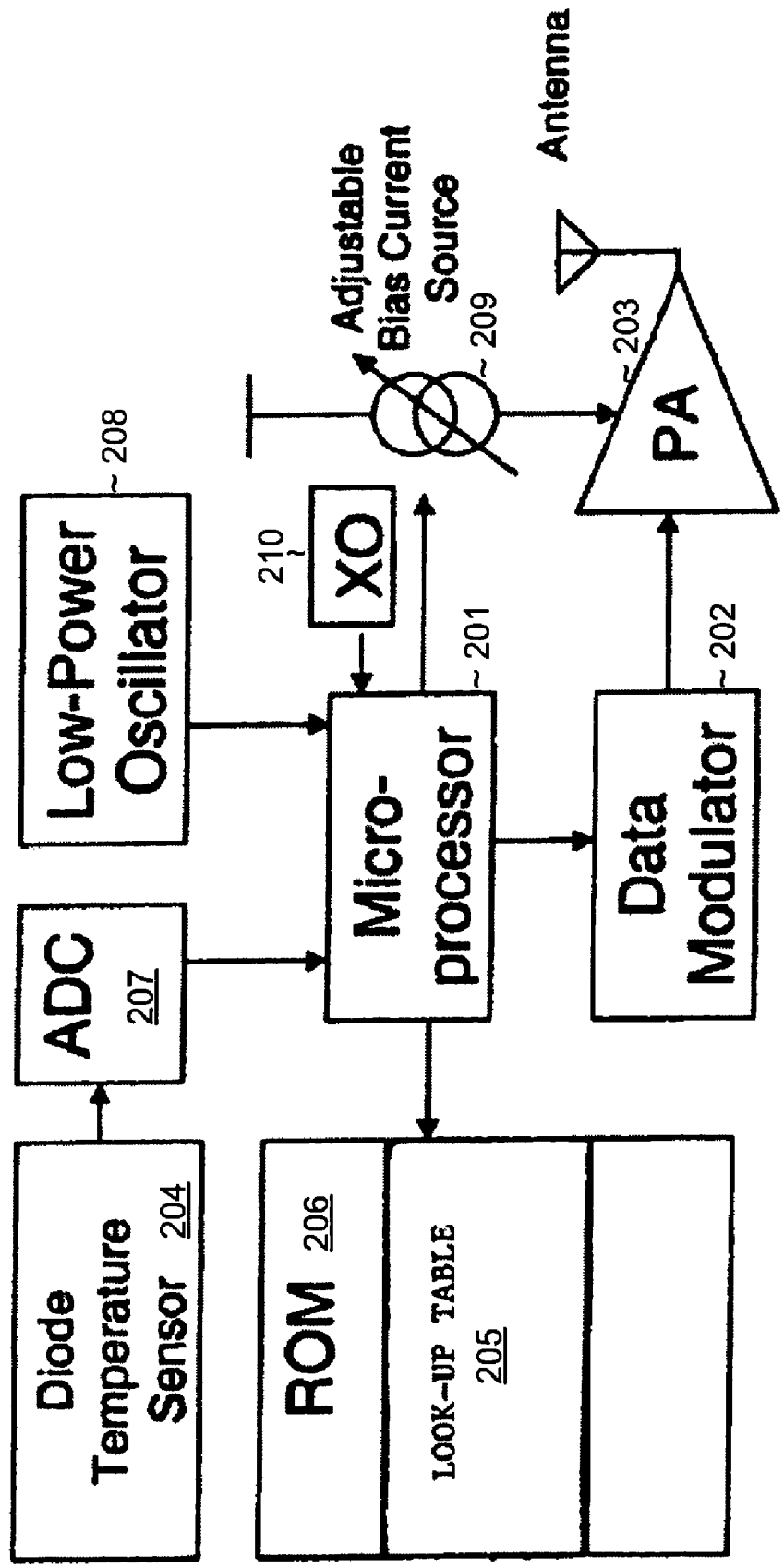
FIG. 2 is an exemplary block diagram for a wireless transmitter, according to one embodiment of the invention.

FIG. 2 depicts an exemplary block diagram for a wireless transmitter. A microprocessor 201 provides data to be transmitted to the data modulator 202. The microprocessor periodically checks temperature sensor 204 (in this example, a diode temperature sensor) and uses a look up table 205 in a memory (for example, ROM 206) to set bias current for the transmit power amplifier (PA) 203 via the adjustable bias current source 209. In one embodiment, the microprocessor uses a mathematical function to calculate the bias from the temperature reading. As a result, the microprocessor "flattens" the output power level versus the temperature resulting in less variation of the output power over temperature.

An example of temperature sensors include a diode-based Proportional To Absolute Temperature (PTAT) source, which produces an output voltage signal related to the temperature of the diode circuit. The output voltage signal is then measured by using an analog-to-digital converter (ADC) 207. Another example of a temperature sensor is a RC-Oscillator-based temperature sensor, in which the temperature is measured by comparing the frequency variation of the oscillator 208 against a precision crystal oscillator (XO) 210.

Figure 3:
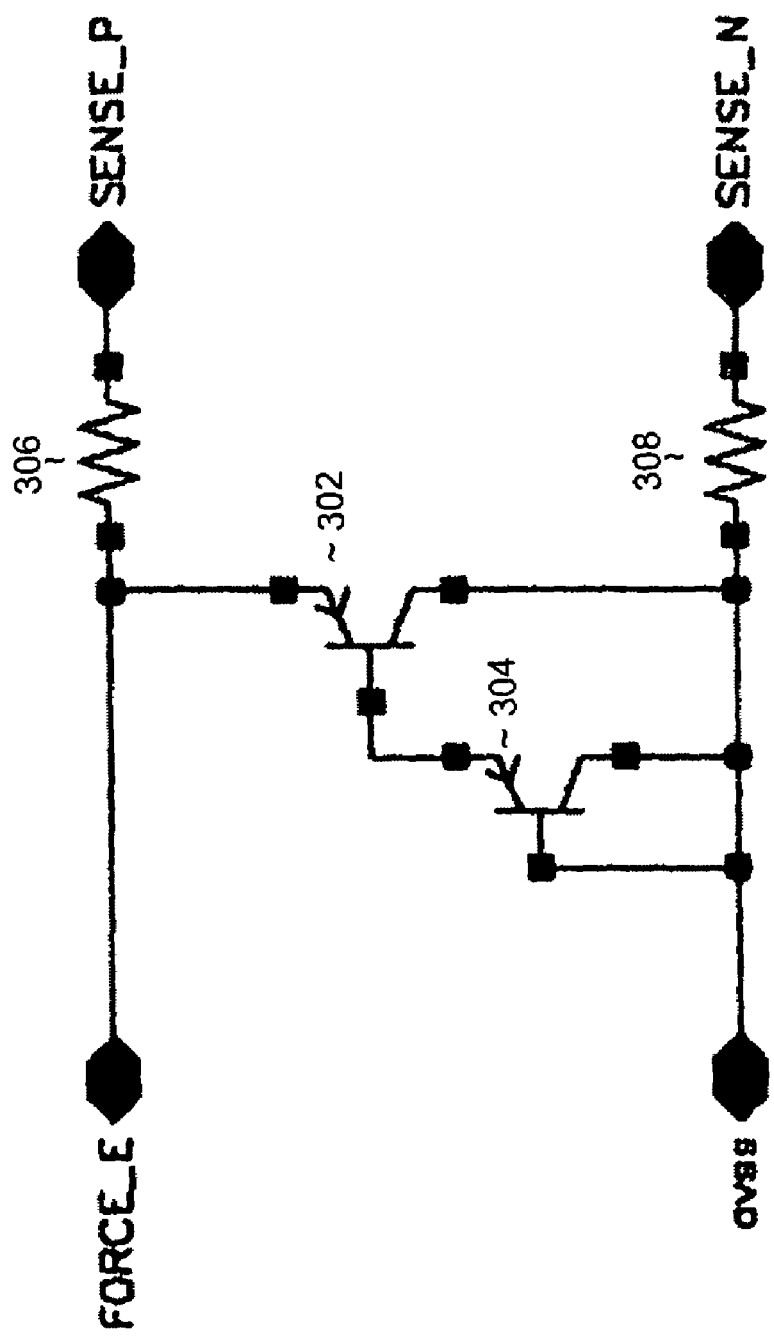
FIG. 3 is an exemplary diagram for a PTAT diode temperature sensing circuit.

FIG. 3 depicts an exemplary PTAT diode temperature sensing circuit. The circuit includes two PNP transistors 302 and 304 in Darlington arrangement to increase temperature sensitivity. The fundamental temperature-sensitive phenomenon is the emitter-to-base diode voltage of each transistor at a given current. A constant current is applied to FORCE_E. The resulting voltage on the diode (via resistors 306 and 308) is measured across SENSE_P and SENSE_N. The measured voltage is proportional to absolute temperature of the PTAT. Very often, two such diodes are used, and the difference between the measured voltages is used to determine the absolute temperature. The voltage is typically measured using an analog-to-digital converter (ADC).

Figure 4:
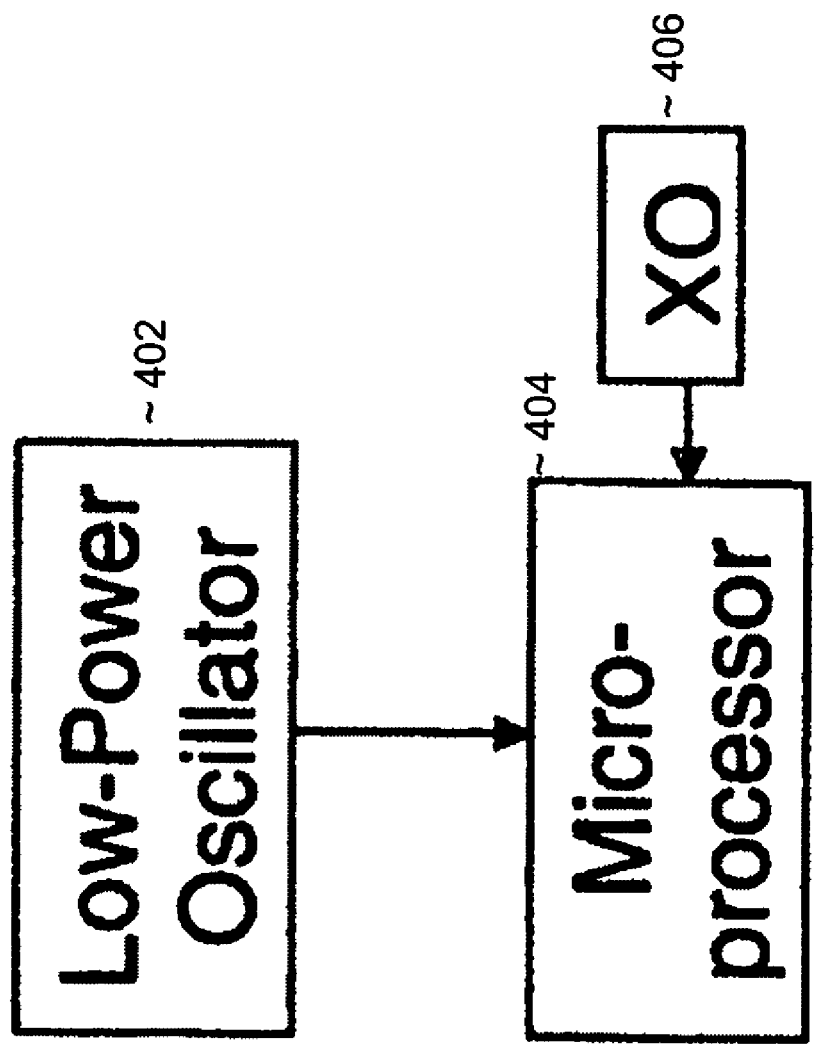
FIG. 4 is an exemplary diagram for a RC-oscillator-based temperature sensor.

FIG. 4 shows an exemplary RC-oscillator-based temperature sensor. Low-power oscillator (LPO) 402 uses a resistor and a capacitor to control the oscillation frequency. The on-chip resistors typically have fairly large variation over temperature, causing the oscillator frequency to be a function of temperature. ±30% variation is typical over a typical temperature range of, for example, 0° C. to 70° C. for a commercial grade IC. Microprocessor 404 can then measure the LPO frequency against the frequency of a crystal oscillator (XO) 406. Crystal oscillator frequency has some temperature sensitivity, but it is typically several orders of magnitude less sensitive than the LPO 402. For example, typical LPO variation may be ±30%, while XO may be ±0.002% Given that a temperature sensor typically exists in wireless (for example, Bluetooth) ICs used in the HIDs, it can be utilized to send temperature data to a user. In a typical wireless communication, when the HID is first recognized by the host, the host requests the "report descriptors" from the HID. The host decodes the report descriptor to determine the types and formats of the reports which the HID can send. The host also determines what type of data is contained in the reports. In one embodiment, the HID protocol employs "Usage Codes" to describe the types of data that will be sent in "reports" to the host device, typically a PC.

For example, in the Bluetooth HID standard, a usage code may be defined for temperature. Thus, the microprocessor can translate the temperature data into the standard format as specified by the HID specification. Software running on the host may then detect the incoming temperature data and display it in a convenient manner to the user on the PC screen. For example, on a PC running the Microsoft Windows XP™ operating system, the temperature may be displayed in the "system tray" area typically located in the lower-right corner of the screen.

Since in a wireless keyboard, the duty cycle of the wireless IC is low, the die temperature typically does not rise noticeably above ambient room temperature. For example, the large size of most keyboards makes it easy to place the IC within the keyboard such that the user's hands will not affect the temperature of the IC.

Any other wireless input device may also employ the present invention. However, if the displayed temperature is intended as the ambient temperature, the temperature of the device should not significantly be impacted by external influences other than the ambient temperature. In one embodiment, the microprocessor can automatically adjust for an estimated difference of the die (HID) temperature and the ambient temperature, before the data is sent to the host, or before the temperature is displayed. In one embodiment, the adjustment data may be stored and modified in a lookup table (for example, in a RAM) accessible by the microprocessor.

Furthermore, specialized devices may be developed to remotely measure indoor or outdoor temperature. In these embodiments, the temperature sensor, processing and wireless transmitter circuitry all are fabricated on a single IC.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A wireless human interface device (HID) including:
    an input module configured to accept manual input from a human being;
    a temperature sensor configured to:
        facilitate the regulation of a wireless transmitter, and
        detect the temperature of at least a portion of the wireless HID; and
    the wireless transmitter configured to transmit the accepted input and detected temperature to a host device.

2. The wireless HID of claim 1, wherein the wireless transmitter includes a Bluetooth transmitter.

3. The wireless HID of claim 1, wherein the temperature sensor includes a duty cycle less than ten percent (10%).

4. The wireless HID of claim 1, wherein the temperature sensor is configured to detect an ambient temperature and not be affected by a temperature of the human being.

5. The wireless HID of claim 1, wherein the temperature sensor is configured to detect changes in a temperature of the human being.

6. The wireless HID of claim 1, wherein the host includes a computing device.

7. A game controller comprising:
- a plurality of input modules configured to accept input from a human being;
- a temperature sensor configured to:
  - facilitate the regulation of a wireless transmitter, and
  - determine the temperature of at least a part of the human being; and
- the wireless transmitter configured to wirelessly transmit the determined temperature to a game system.

8. The game controller of claim 7, wherein the temperature sensor is configured to determine the relative temperature difference between the human being and an ambient temperature.

9. The game controller of claim 7, wherein the temperature sensor is configured to determine the temperature of the hand of the human being.

10. The game controller of claim 7, wherein the temperature sensor is configured to provide biofeedback to the game system.

11. The game controller of claim 7, wherein the transmitter is configured to recalibrate itself based at least in part upon the temperature detected by the temperature sensor.

12. The game controller of claim 7, wherein the transmitter is configured to transmit the temperature to the game system in such a way as to facilitate the display of the temperature by the game system.

13. The game controller of claim 7, wherein the transmitter is configured to transmit the temperature in a manner substantially compliant with the Bluetooth HID standard.

14. The game controller of claim 13, wherein the transmitter is configured to transmit the temperature using a usage code.

15. The game controller of claim 13, wherein the transmitter is configured to, in response to a request for a description of capabilities of the game controller, transmit that the game controller is capable of transmitting temperature.

16. A keyboard comprising:
- a microprocessor configured to receive input data from a human being via keys;
- a temperature sensor configured to:
  - facilitate the regulation of a wireless transmitter, and
  - detect the temperature of at least part of the keyboard; and
- the wireless transmitter configured to wirelessly transmit the detected temperature and data provided by the microprocessor to a host device.

17. The keyboard of claim 16 wherein the microprocessor is configured to calibrate the transmitter responsive to the detected temperature.

18. The keyboard of claim 16 wherein the transmitter is configured to transmit using a protocol substantially complaint with the Bluetooth protocol.

19. The keyboard of claim 16 wherein the temperature sensor is configured to not be substantially affected by a temperature of the human being.

20. The keyboard of claim 16 wherein the transmitter is configured to transmit the detected temperature to the host device for displaying.

* * * * *

UNITED STATES PATENT AND TRADEMARK OFFICE
CERTIFICATE OF CORRECTION

| | | |
|---|---|---|
| PATENT NO. | : 7,532,116 B2 | Page 1 of 1 |
| APPLICATION NO. | : 12/046738 | |
| DATED | : May 12, 2009 | |
| INVENTOR(S) | : Robert William Hulvey | |

It is certified that error appears in the above-identified patent and that said Letters Patent is hereby corrected as shown below:

On the Title page, in field (75), in "Inventor" in column 1, line 1, delete "W." and insert -- William --, therefor.

In column 1, line 14, delete "it" and insert -- its --, therefor.

In column 5, line 22, in claim 11, delete "recalibrate" and insert -- re-calibrate --, therefor.

Signed and Sealed this
First Day of January, 2013

David J. Kappos
*Director of the United States Patent and Trademark Office*